United States Patent
Mehrotra et al.

(10) Patent No.: US 8,897,358 B2
(45) Date of Patent: Nov. 25, 2014

(54) 3:2 PULL DOWN DETECTION IN VIDEO

(75) Inventors: Mudit Mehrotra, Sitapur (IN); Soyeb N. Nagori, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 450 days.

(21) Appl. No.: 13/323,882

(22) Filed: Dec. 13, 2011

(65) Prior Publication Data

US 2012/0163447 A1 Jun. 28, 2012

(30) Foreign Application Priority Data

Dec. 22, 2010 (IN) .......................... 3929/CHE/2010

(51) Int. Cl.
H04N 7/12 (2006.01)
H04N 11/02 (2006.01)
H04N 11/04 (2006.01)
H04B 1/66 (2006.01)
H04N 5/14 (2006.01)
H04N 7/01 (2006.01)

(52) U.S. Cl.
CPC ............ H04N 5/144 (2013.01); H04N 7/0115 (2013.01)
USPC ............ 375/240.02; 375/240.01; 375/240.14; 348/97; 348/400.1

(58) Field of Classification Search
USPC .......................................................... 375/240
See application file for complete search history.

(56) References Cited

U.S. PATENT DOCUMENTS

| | | | | |
|---|---|---|---|---|
| 5,091,782 A | * | 2/1992 | Krause et al. | 348/400.1 |
| 5,434,622 A | * | 7/1995 | Lim | 348/400.1 |
| 6,041,142 A | * | 3/2000 | Rao et al. | 382/232 |
| 6,226,327 B1 | * | 5/2001 | Igarashi et al. | 375/240.14 |
| 7,082,161 B2 | * | 7/2006 | Sumiyoshi et al. | 375/240.01 |
| 2007/0188607 A1 | * | 8/2007 | Jia et al. | 348/97 |
| 2008/0263621 A1 | * | 10/2008 | Austerlitz et al. | 725/139 |
| 2011/0013081 A1 | | 1/2011 | Wredenhagen et al. | |
| 2011/0019085 A1 | | 1/2011 | Chen | |
| 2011/0080525 A1 | | 4/2011 | Bock et al. | |
| 2011/0211074 A1 | * | 9/2011 | Doswald | 348/180 |

FOREIGN PATENT DOCUMENTS

WO     WO 2009056978 A2 *  5/2009

OTHER PUBLICATIONS

"TMS320DM816x DaVinci Digital Media Processors", SPRS614, Texas Instruments Incorporated, Mar. 2011, pp. 1-312.

* cited by examiner

*Primary Examiner* — Joseph Ustaris
*Assistant Examiner* — Talha Nawaz
(74) *Attorney, Agent, or Firm* — Frederick J. Telecky, Jr.; Wade J. Brady, III (57) ABSTRACT

Methods for processing of video sequences that may contain telecined (3:2 pull down) frame sequences are provided. A method for detecting 3:2 pull down is provided that measures vertical detail in frames of a video sequence and uses the variation in vertical detail over time to decide whether the video sequence contains normal interlace content or 3:2 pull down content. A method for improving the compression of detected 3:2 pull down content is also provided that controls the selection of field or frame coding mode for frames of 3:2 pull down content and the selection of reference fields for encoding duplicated fields in the 3:2 pull down content.

17 Claims, 7 Drawing Sheets

3:2 PULL DOWN DETECTION IN VIDEO

CROSS-REFERENCE TO RELATED APPLICATIONS

This application claims benefit of co-pending India Provisional Patent Application Serial No. 3929/CHE/2010, entitled "Reverse 3:2 Pull-Down Detection for Improving Video Compression Efficiency," filed Dec. 22, 2010, which is incorporated herein by reference in its entirety.

BACKGROUND OF THE INVENTION

1. Field of the Invention

Embodiments of the present invention generally relate to detecting 3:2 pull down in a video stream and using the detection to improve processing of the video stream.

2. Description of the Related Art

Figure 1:
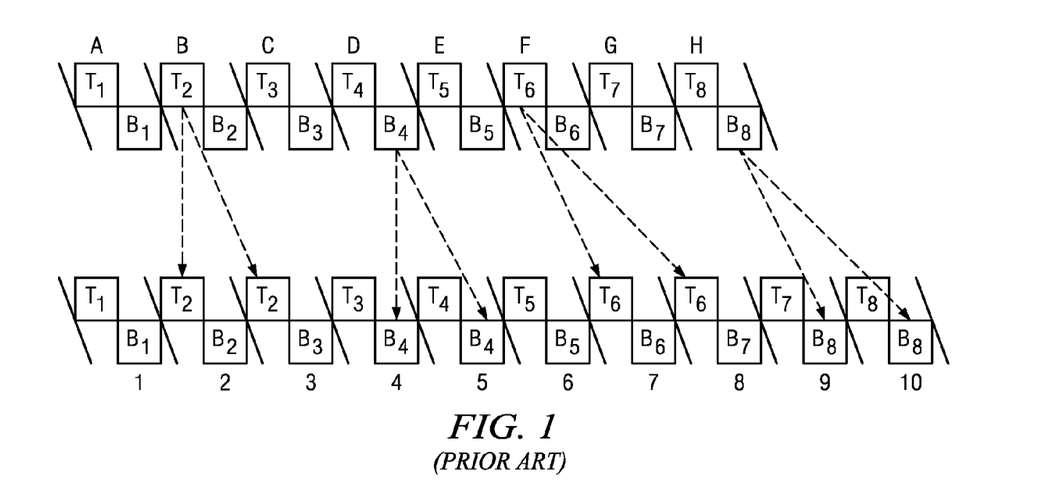
FIG. 1 shows an example of 3:2 pull down.

Telecine or 3:2 pull down is a process of converting motion picture film captured at 24 frames per second (fps) to interlaced video with a run rate of 30 fps (or 60 fields per second). This conversion is performed by distributing the frame content of the film into video fields such that every four frames of the film are "stretched" into five interlaced video frames (10 fields). The stretching is accomplished by duplicating two fields of the 24 fps content. FIG. 1 shows an example of 3:2 pull down applied to eight frames, A-H, of 24 fps content to generate 10 frames, 1-10, of 30 fps content. Each frame of the 24 fps content is divided into two fields, a top field and a bottom field.

The top and bottom fields of frame A become the top and bottom fields of frame 1, and the top and bottom fields of frame B become the top and bottom fields of frame 2. To create frame 3, the top field of frame B and the bottom field of frame C are used. To create frame 4, the top field for frame C and the bottom field of frame D are used. The top and bottom fields of frame D become the top and bottom fields of frame 5. This pattern is then replicated for the next four frames, E-H, of the 24 fps content to create frames 6-10 of the 30 fps content.

Telecined video may provide no overt information indicating that the video is telecined and/or the 3:2 pull down pattern may not be consistent throughout the video. For example, the pattern may be disrupted by editing of the video. Some detection techniques compare the differences between adjacent fields to look for the 3:2 pattern. However, such techniques may not be able to reliably distinguish between noise, slow movements, high frequencies, and interlaced content. Other detection techniques analysis the motion vector data from field to field. Such techniques may be quite complex and not suitable for use in resource limited embedded systems.

SUMMARY

Embodiments of the present invention relate to detection of 3:2 pull down content in video and improved compression of detected 3:2 pull down content. In one aspect, a method for processing a video sequence is provided that includes computing frame vertical detail and field vertical detail for a frame in the video sequence, wherein frame vertical detail is indicative of correlation between adjacent rows of pixel values in the frame and field vertical detail is indicative of correlation between adjacent rows of pixel values in fields of the frame, and indicating 3:2 vertical pull down in the video sequence based on the frame vertical detail and the field vertical detail. Indicating 3:2 vertical pull down may include computing an average of field vertical detail for a plurality of frames, wherein the plurality of frames comprises the frame, and indicating 3:2 vertical pull down in the video sequence when frame vertical detail for any frame in the plurality of frames is sufficiently larger than the average of field vertical detail.

In one aspect, a method for processing a video sequence is provided that includes detecting that a frame is part of a 3:2 vertical pull down sequence in the video sequence, and selecting a coding mode for the frame responsive to the detecting, wherein the coding mode is one selected from a field coding mode and a frame coding mode. Selecting a coding mode may include selecting the field coding mode when a top field of the frame and a bottom field of the frame were captured at non-consecutive time intervals, selecting the field coding mode when the top field and the bottom field were captured at consecutive time intervals and a field in the frame is a duplicated field, and using a picture adaptive frame-field (PAFF) algorithm to select the coding mode when the top field and the bottom field were captured at consecutive time intervals and neither field in the frame is a duplicated field.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Detection of telecined video is important for applications such as deinterlacing, noise filtering, and compression. For example, in compression of telecined video, if frame based coding is used, one fourth of the frames may be made up of two fields from different source film frames, resulting in poor compression and visible artifacts. And, if field based coding is used, two redundant fields may be coded for each ten frames, resulting in reduced compression efficiency.

Some embodiments of the invention provide for detection of 3:2 pull down in a video stream. More specifically, embodiments of the invention measure vertical detail at the frame level and the field level. The frame vertical detail, i.e., VDframe, is a measure of the correlation between adjacent rows of pixels in a frame. As the correlation between adjacent rows increases, the value of VDframe decreases. The field vertical detail, i.e., VDfield, is a measure of the correlation between alternate rows of pixels in a frame, or between adjacent rows of pixels in a field. As the correlation between adjacent rows increases, the value of VDframe decreases. As is explained in more detail herein, the frame vertical detail and field vertical detail are computed for each frame of video and used to detect 3:2 pull down.

In some embodiments, 3:2 pull down detection is used to improve compression of a video stream. Many video encoders apply a picture adaptive frame-field (PAFF) algorithm to decide whether interlaced pictures should be coded as a frame or as two fields. The detection of 3:2 pull down and the VDframe values may be used to improve the frame-field coding mode decision process and to control the selection of reference fields for the duplicated fields in the pull down frame sequences.

Figure 2:
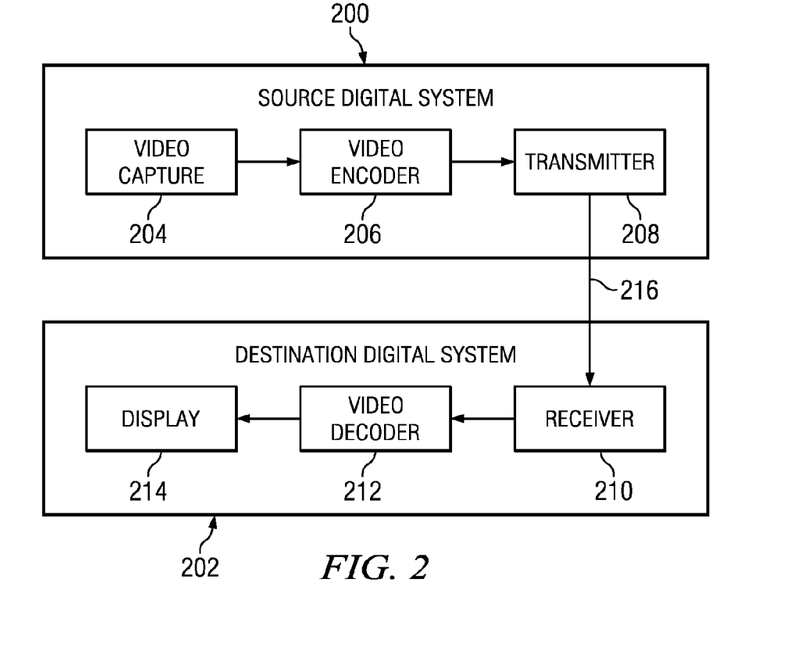
FIG. 2 is a block diagram of an illustrative digital system.

FIG. 2 shows a block diagram of a digital system. The system includes a source digital system 200 that transmits encoded video sequences to a destination digital system 202 via a communication channel 216. The source digital system 200 includes a video capture component 204, a video encoder component 206 and a transmitter component 208. The video capture component 204 is configured to provide a video sequence to be encoded by the video encoder component 206. The video capture component 204 may be for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of frames, divides the frames into macroblocks, and encodes the video data in the macroblocks. The video encoder component 206 may be configured to perform 3:2 pull down detection as described herein. The video encoder component 206 may also be configured to use the 3:2 pull down detection to inform the choice of field or frame encoding and the choice of reference fields for certain fields as described herein. An embodiment of a video encoder is described in more detail below in reference to FIGS. 3A and 3B.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the macroblocks of the video sequence. The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video streaming, video broadcasting, video conferencing, gaming, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3A:
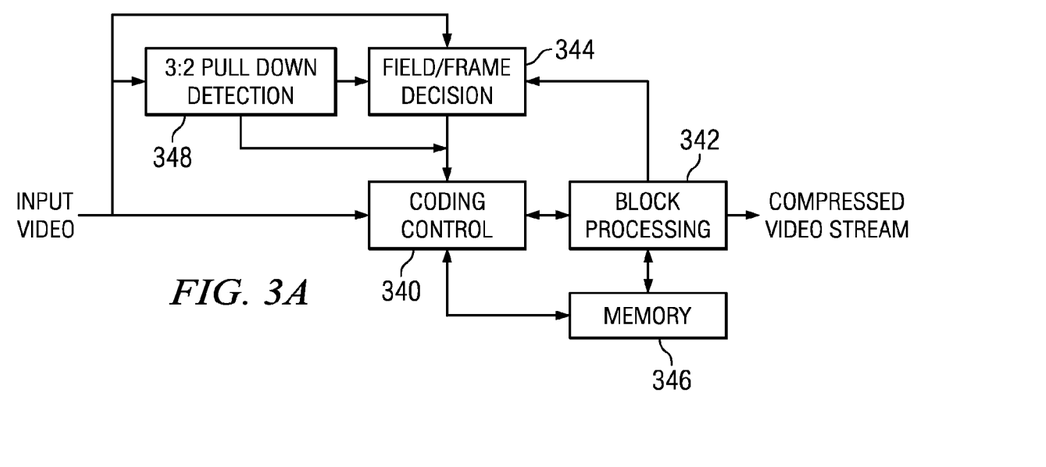
FIGS. 3A and 3B are block diagrams of a video encoder.
Figure 3B:
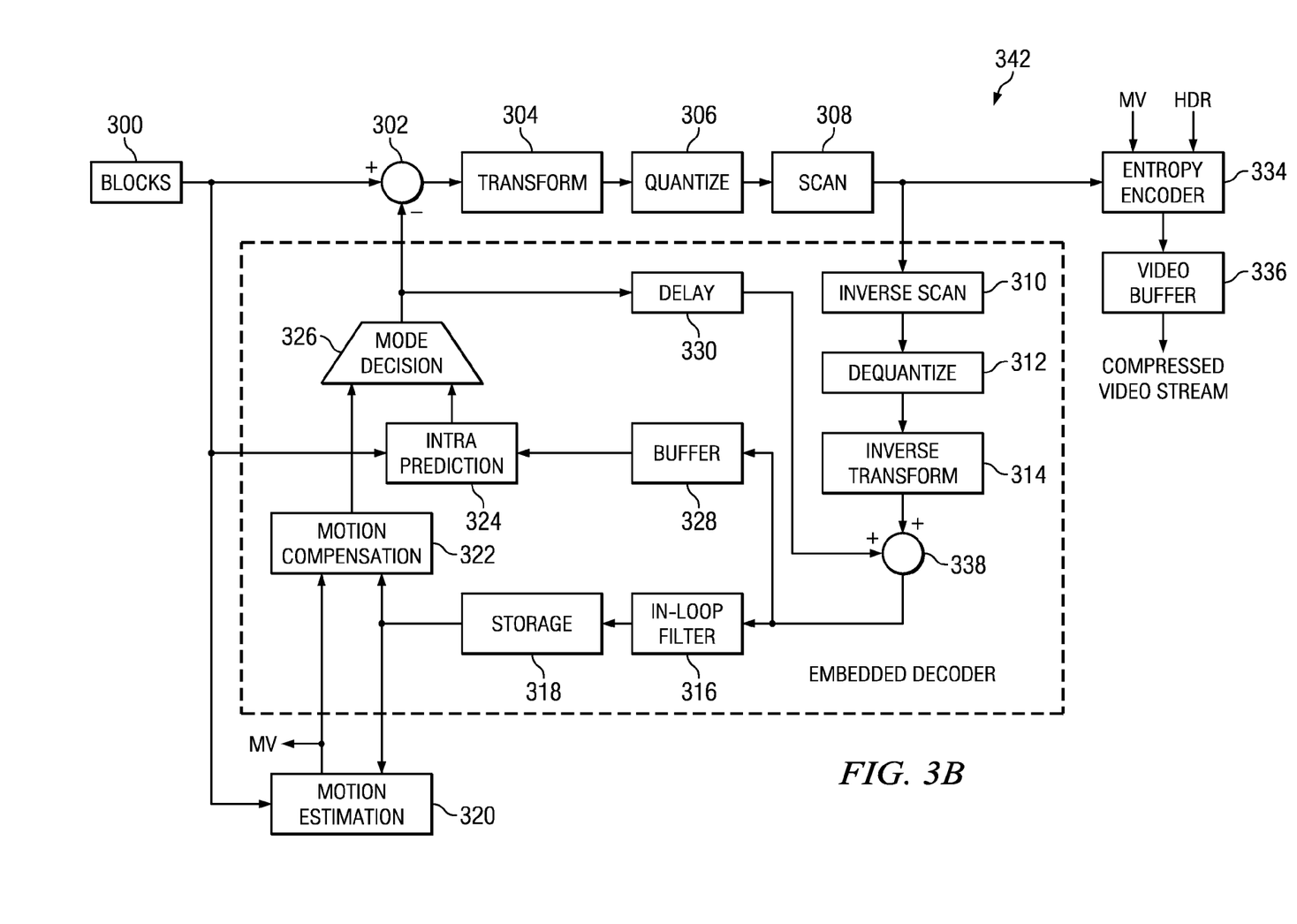

FIGS. 3A and 3B show block diagrams of a video encoder, e.g., the video encoder 206 of FIG. 2, configured to perform 3:2 pull down detection and to use the pull down detection in the selection of field or frame coding mode and the selection of reference fields. For illustrative purposes, the video encoder is assumed to perform compression in accordance with the H.264/AVC video coding standard. FIG. 3A shows a high level block diagram of the video encoder and FIG. 3B shows a block diagram of the block processing component 342 of the video encoder.

As shown in FIG. 3A, a video encoder includes a coding control component 340, a block processing component 342, a field/frame decision component 344, a 3:2 pull down detection component 348, and a memory 346. The memory 346 may be internal memory, external memory, or a combination thereof. The memory 346 may be used, for example, to store information for communication between the various components of the video encoder.

The 3:2 pull down detection component 348 processes the frames of the video sequence to determine if 3:2 pull down frames are present in the video. In general, the 3:2 pull down detection component 348 computes VDframe and VDfield for each frame and uses these values to detect the presence of 3:2 pull down. A method for 3:2 pull down detection is described below in reference to FIG. 4. The 3:2 pull down detection component 348 provides an indication whether or not 3:2 pull down is present to the field/frame decision component 344. This indication is provided for each frame.

The field/frame decision component 344 determines whether frames are to be coded in frame mode or in field mode. The indication of whether or not 3:2 pull down is present in the video sequence from the 3:2 pull down detection component 348 is used as part of the decision process. For example, if 3:2 pull down is not detected for a frame, a PAFF algorithm determines whether the frame should be coded in field or frame mode. However, if 3:2 pull down is detected, the value of VDframe for the current frame may be used to decide whether field or frame mode is to be used. A method for performing the field/frame coding mode decision based on 3:2 pull down detection is described below in reference to FIGS. 6A and 6B. The coding mode decision is provided to the coding control component 340.

In some embodiments, the field/frame decision component 344 also determines the reference fields to be used for prediction of duplicated fields in the 3:2 pull down video. Determination of the reference fields is also described below in reference to FIGS. 6A and 6B. The reference field selections are provided to the coding control component 340.

The coding control component 340 sequences the various operations of the video encoder, i.e., the coding control component 340 runs the main control loop for video encoding. For example, the coding control component 340 performs any processing on the input video sequence that is to be done at the picture level, such as determining the coding type (I, P, or B), i.e., prediction mode, of each picture based on the coding structure, e.g., IPPP, IBBP, hierarchical-B, being used. In general, an I-frame or intracoded frame is coded without reference to other frames, a P-frames or predicted frame is coded using motion compensated prediction from a past I-frame or P-frame, and B-frame or bidirectionally coded frame is coded using motion compensated prediction from both past and future frames.

The coding control component 340 receives the field/frame coding mode decisions from the field/frame decision component 344 and controls the coding of each frame according to the selected mode. The coding control component 340 also divides each picture into macroblocks for further processing by the block processing component 342. Further, the coding control component 340 selects the reference frame(s) or reference field(s) to be used for prediction of a frame or field and provides an indication of the selected frame(s) or field(s) to the motion estimation component 320 and the motion compensation component 322 of the block processing component 342. If the field/frame decision component 344 also determines reference fields for the duplicated fields in a 3:2 pull down sequence, the coding control component 340 uses the reference fields indicated by the field/frame decision component 344 rather than the reference fields that would have otherwise been used.

The block processing component 342 receives macroblocks from the coding control component 340 and encodes the macroblocks under the control of the coding control component 340 to generate the compressed video stream. FIG. 3B shows the basic coding architecture of the block processing component 342. The macroblocks 300 from the coding control component 340 are provided as one input of a motion estimation component 320, as one input of an intra prediction component 324, and to a positive input of a combiner 302 (e.g., adder or subtractor or the like). Further, although not specifically shown, the prediction mode of each picture as selected by the coding control component 340 is provided to a mode decision component 326, and the entropy encoder 334.

The storage component 318 provides reference data to the motion estimation component 320 and to the motion compensation component 322. The reference data may include one or more previously encoded and decoded macroblocks, i.e., reconstructed macroblocks.

The motion estimation component 320 provides motion estimation information to the motion compensation component 322 and the entropy encoder 334. More specifically, the motion estimation component 320 performs tests on macroblocks based on multiple temporal prediction modes using reference data from storage 318 to choose the best motion vector(s)/prediction mode based on a coding cost. The reference data used for each frame or field is from reference frame(s) or field(s) indicated by the coding control component 340. To perform the tests, the motion estimation component 320 may divide each macroblock into prediction units according to the unit sizes of prediction modes and calculate the coding costs for each prediction mode for each macroblock. The coding cost calculation may be based on the quantization scale for a macroblock as determined by the rate control component 344.

The motion estimation component 320 provides the selected motion vector (MV) or vectors and the selected prediction mode for each inter-predicted macroblock to the motion compensation component 322 and the selected motion vector (MV) to the entropy encoder 334. The motion compensation component 322 provides motion compensated inter-prediction information to the mode decision component 326 that includes motion compensated inter-predicted macroblocks and the selected temporal prediction modes for the inter-predicted macroblocks. The coding costs of the inter-predicted macroblocks are also provided to the mode decision component 326.

The intra-prediction component 324 provides intra-prediction information to the mode decision component 326 that includes intra-predicted macroblocks and the corresponding spatial prediction modes. That is, the intra prediction component 324 performs spatial prediction in which tests based on multiple spatial prediction modes are performed on macroblocks using previously encoded neighboring macroblocks of the picture from the buffer 328 to choose the best spatial prediction mode for generating an intra-predicted macroblock based on a coding cost. To perform the tests, the intra prediction component 324 may divide each macroblock into prediction units according to the unit sizes of the spatial prediction modes and calculate the coding costs for each prediction mode for each macroblock. The coding cost calculation may be based on the quantization scale for a macroblock as determined by the rate control component 344. Although not specifically shown, the spatial prediction mode of each intra predicted macroblock provided to the mode decision component 326 is also provided to the transform component 304. Further, the coding costs of the intra predicted macroblocks are also provided to the mode decision component 326.

The mode decision component 326 selects a prediction mode for each macroblock based on the coding costs for each prediction mode and the picture prediction mode. That is, the mode decision component 326 selects between the motion-compensated inter-predicted macroblocks from the motion compensation component 322 and the intra-predicted macroblocks from the intra prediction component 324 based on the coding costs and the picture prediction mode. The output of the mode decision component 326, i.e., the predicted macroblock, is provided to a negative input of the combiner 302 and to a delay component 330. The output of the delay component 330 is provided to another combiner (i.e., an adder) 338. The combiner 302 subtracts the predicted macroblock from the current macroblock to provide a residual macroblock to the transform component 304. The resulting residual macroblock is a set of pixel difference values that quantify differences between pixel values of the original macroblock and the predicted macroblock.

The transform component 304 performs unit transforms on the residual macroblocks to convert the residual pixel values to transform coefficients and provides the transform coefficients to a quantize component 306. The quantize component 306 quantizes the transform coefficients of the residual macroblocks based on quantization scales provided by the coding control component 340. For example, the quantize component 306 may divide the values of the transform coefficients by a quantization scale (Qs). In some embodiments, the quantize component 306 represents the coefficients by using a desired number of quantization steps, the number of steps used (or correspondingly the value of Qs) determining the number of bits used to represent the residuals. Other algorithms for quantization such as rate-distortion optimized quantization may also be used by the quantize component 306.

Because the transform redistributes the energy of the residual signal into the frequency domain, the quantized transform coefficients are taken out of their scan ordering by a scan component 308 and arranged by significance, such as, for example, beginning with the more significant coefficients followed by the less significant. The ordered quantized transform coefficients for a macroblock provided via the scan component 308 along with header information for the macroblock and the quantization scale used are coded by the entropy encoder 334, which provides a compressed bit stream to a video buffer 336 for transmission or storage. The entropy coding performed by the entropy encoder 334 may be use any suitable entropy encoding technique, such as, for example, context adaptive variable length coding (CAVLC), context adaptive binary arithmetic coding (CABAC), run length coding, etc.

Inside the block processing component 342 is an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a macroblock provided via the scan component 308 are returned to their original post-transform arrangement by an inverse scan component 310, the output of which is provided to a dequantize component 312, which outputs estimated transformed information, i.e., an estimated or reconstructed version of the transform result from the transform component 304. The dequantize component 312 performs inverse quantization on the quantized transform coefficients based on the quantization scale used by the quantize component 306. The estimated transformed information is provided to the inverse transform component 314, which outputs estimated residual information which represents a reconstructed version of a residual macroblock. The reconstructed residual macroblock is provided to the combiner 338.

The combiner 338 adds the delayed selected macroblock to the reconstructed residual macroblock to generate an unfiltered reconstructed macroblock, which becomes part of reconstructed picture information. The reconstructed picture information is provided via a buffer 328 to the intra-prediction component 324 and to a filter component 316. The filter component 316 is an in-loop filter which filters the reconstructed picture information and provides filtered reconstructed macroblocks, i.e., reference data, to the storage component 318.

The components of the video encoder of FIGS. 3A and 3B may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software instructions may be initially stored in a computer-readable medium such as compact disc (CD), a diskette, a tape, a file, memory, or any other computer readable storage device, and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 4:
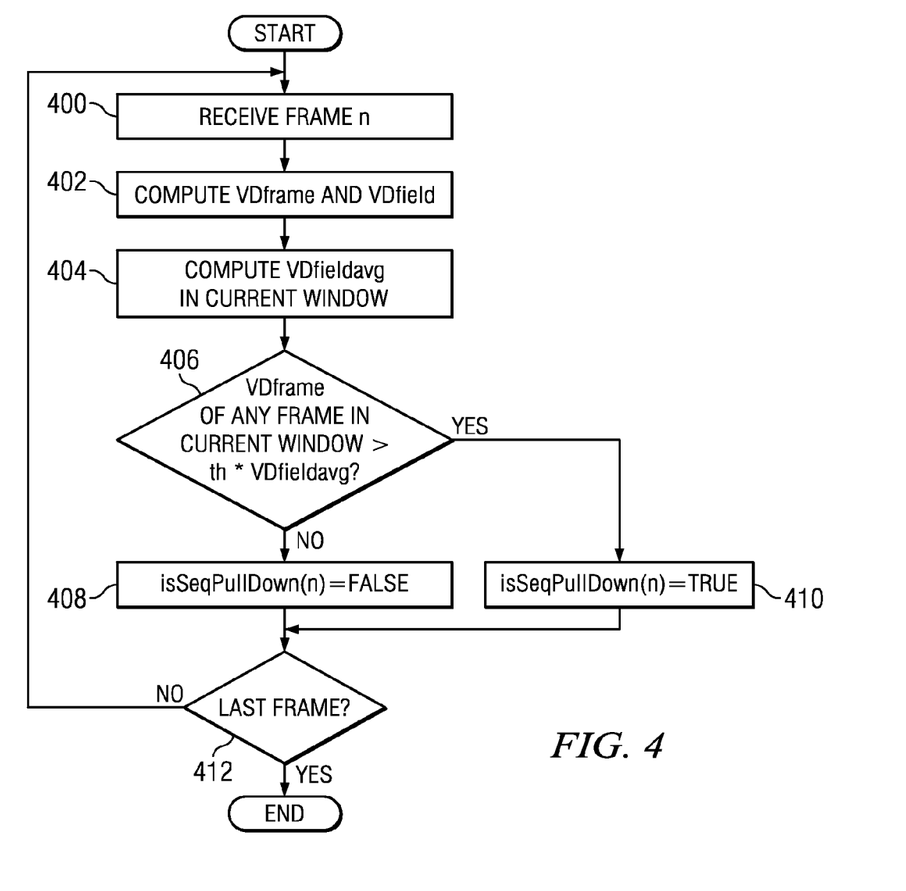
FIG. 4 is a flow diagram of a method for 3:2 pull down detection.

FIG. 4 is a flow diagram of a method for 3:2 pull down detection in a video stream that may be implemented by the 3:2 pull down detection component 318 of FIG. 3A. The method is described with respect to the video encoder of FIGS. 3A and 3B merely for illustration. As will be apparent to one of ordinary skill in the art having benefit of the disclosure provided herein, embodiments of the method can be implemented in other devices and using other components.

The method relies on measurements of vertical detail in a video sequence. Variation of vertical detail with time is used to decide whether the video sequence contains normal interlaced content or 3:2 pull down content. Two measures of vertical detail are considered—frame vertical detail (VDframe) and field vertical detail (VDfield). VDframe is a measure of the correlation between adjacent rows of pixels in an interleaved frame. VDframe may be computed as the sum of the differences between adjacent rows of pixels in the frame or $$VDframe = \sum_{x=0}^{width-1} \sum_{y=0}^{height-3} |p(x, y+1) - p(x, y)|$$

where width is the frame width and height is the frame height. Note that as the correlation between rows increases, the value of VDframe decreases. VDfield is a measure of the correlation between alternate rows of pixels in an interleaved frame. In other words, VDfield is a measure of correlation between adjacent rows of pixels in a field. VDfield may be computed as the sum of the differences between alternate rows of pixels in a frame or $$VDfield = \sum_{x=0}^{width-1} \sum_{y=0}^{height-3} |p(x, y+2) - p(x, y)|$$

where width is the frame width and height is the frame height. Note that as the correlation between adjacent rows of pixels of a field increases, the value of VDfield decreases.

In the above equations, VDframe and VDfield are computed using the same number of pixel differences. This avoids the need to perform division to normalize the results. This reduces complexity as division can be a computationally expensive operation. In some embodiments, differing numbers of pixel differences may be used and normalization performed.

Complexity may be further reduced by not computing vertical detail for an entire frame. Rather, a decimated vertical detail measure may be computed using certain portions of the frame. The pixels values used for calculating decimated vertical detail should be well distributed over the entire frame. For example, VDframe and VDfield may be computed using the pixel values in every fourth macroblock horizontally and every fourth macroblock vertically in a frame, i.e., $$VDframe = \sum_{blkX=0}^{\left(\frac{width}{64}\right)} \sum_{blkY=0}^{\left(\frac{height}{64}\right)} \sum_{x=0}^{15} \sum_{y=0}^{13} \left| \begin{array}{c} p(blkX*64+x, blkY*64+y+1) - \\ (p(blkX*64+x, blkY*64+y) \end{array} \right|$$

$$VDfield = \sum_{blkX=0}^{\left(\frac{width}{64}\right)} \sum_{blkY=0}^{\left(\frac{height}{64}\right)} \sum_{x=0}^{15} \sum_{y=0}^{13} \left| \begin{array}{c} p(blkX*64+x, blkY*64+y+2) - \\ (p(blkX*64+x, blkY*64+y) \end{array} \right|$$

where a macroblock is assumed to be 16×16. Other block sizes and/or other block distributions may used.

In another example, VDframe and VDfield may be computed using the pixels values of the top four lines of every fourth macroblock in the horizontal direction, i.e., $$VDframe = \sum_{blkX=0}^{\left(\frac{width}{64}\right)} \sum_{blkY=0}^{\left(\frac{height}{16}\right)} \sum_{x=0}^{15} \sum_{y=0}^{1} \left| \begin{array}{c} p(blkX*64+x, blkY*64+y+1) - \\ (p(blkX*64+x, blkY*64+y) \end{array} \right|$$

$$VDfield = \sum_{blkX=0}^{\left(\frac{width}{64}\right)} \sum_{blkY=0}^{\left(\frac{height}{16}\right)} \sum_{x=0}^{15} \sum_{y=0}^{1} \left| \begin{array}{c} p(blkX*64+x, blkY*64+y+2) - \\ (p(blkX*64+x, blkY*64+y) \end{array} \right|$$

where a macroblock is assumed to be 16×16. Other block sizes, block distributions, and/or numbers of lines in a block may used. For these two examples, the computation of the decimated vertical detail measures is about $\frac{1}{16}^{th}$ the complexity of the computation of the undecimated vertical detail measures.

Referring back to the example 3:2 pull down sequence of FIG. 1, it would be expected that frames 3, 4, 8, and 9 will have very high VDframe values as compared to the other frames as these frames are composed of fields that were not captured consecutively. More specifically, suppose the time elapsed between the capture of two consecutive fields in the original 24 fps video is $T_f$. Frames 1, 2, 5, 6, 7, and 10 are composed of fields that were captured consecutively at time instances separated by $T_f$. Such frames may be referred to as $T_f$ frames or non-pull down frames herein. However, frames 3, 4, 8, and 9 are composed of fields that were captured at time instances separated by $3*T_f$. Such frames may be referred to as $3*T_f$ frames or pull down frames herein. Thus, the correlation between the rows in frames 3, 4, 8, and 9, i.e., the $3*T_f$ frames, will be much lower than that between the rows of the other frames, i.e., the $T_f$ frames. Accordingly, the value of VDframe for frames 3, 4, 8, and 9 will be much higher than that of the other frames.

Figure 5:
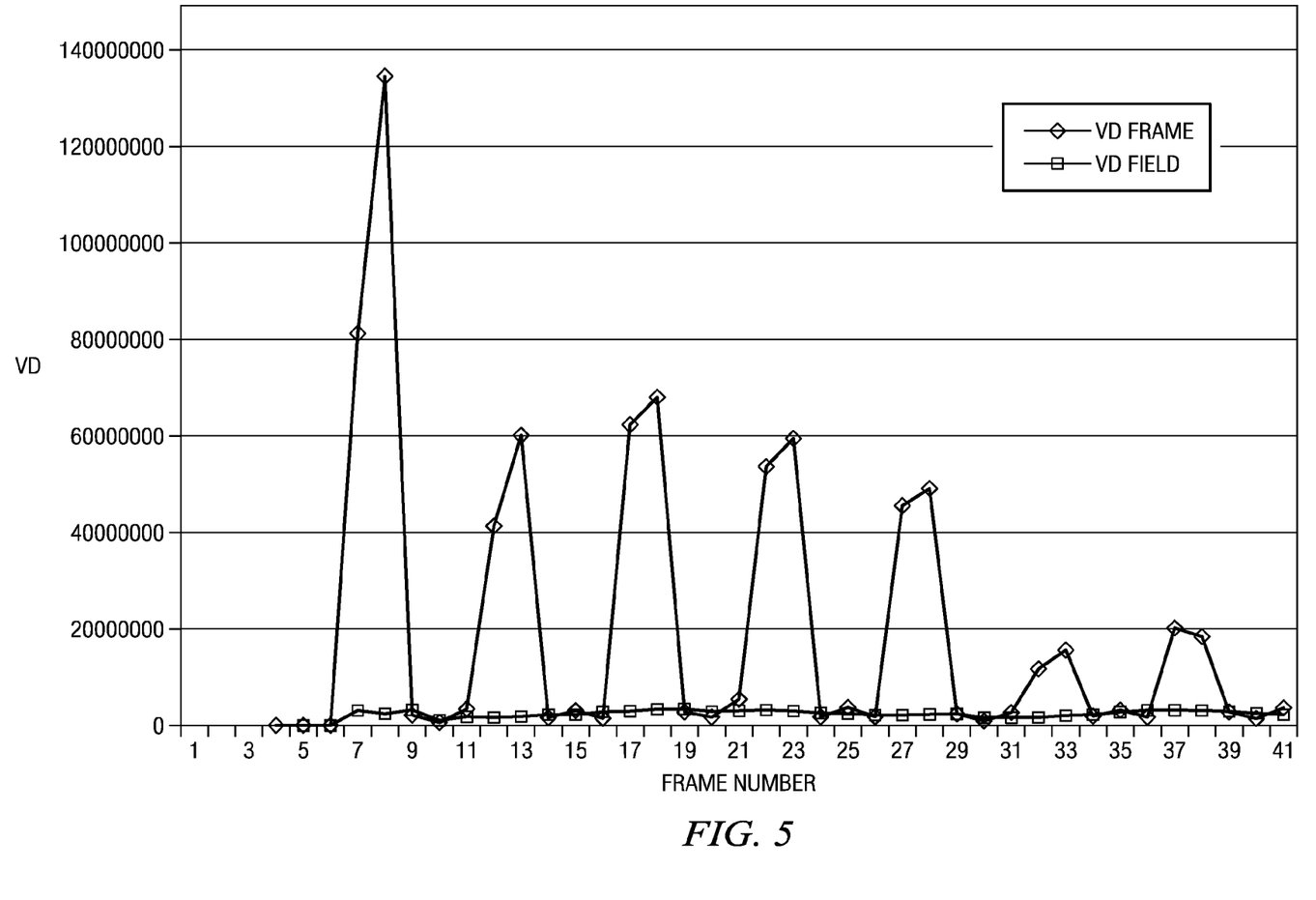
FIG. 5 is a graph.

The graph of FIG. 5 illustrates the variation VDframe and VDfield values for a sample 3:2 pull down sequence. Note that VDframe shows high peaks followed by dips. The high peaks occur at the frames composed of fields captured at time instances separated by $3*T_f$. Such a pattern of high peaks followed by dips is not likely to occur in normal interlaced video as the fields in each frame are captured consecutively. The method for 3:2 pull down detection method of FIG. 4 uses this difference in vertical detail over time between normal interlaced video and 3:2 pull down video to decide whether or not 3:2 pull down is present in a video sequence.

Referring now to FIG. 5, note that the method is performed for each frame in a video sequence. The frames are processed in display order. The variable n is a frame counter and is initially set to 0. The method uses a moving window of k sequential frames to decide at each frame whether or not 3:2 pull down is present in the video sequence (whether the frame is part of a 3:2 pull down sequence). The value of k may be any suitable value and may be empirically determined. As each frame is received, that frame is added as the newest frame in the window and the oldest frame in the window is dropped. The method is described assuming that k frames have already been processed. One of ordinary skill in the art having benefit of this disclosure will understand the appropriate processing of the initial k frames. In this method, an indication of 3:2 pull down or no 3:2 pull down is set for every frame. The per-frame indicators may be stored in memory, e.g., the memory component 346 of FIG. 3A, such that they may be accessed using the number of the frame in the video sequence, e.g., in an array or a circular buffer. This data structure is referred to as is SeqPulldown in the method description.

Initially a frame of video, i.e., frame n, is received 400. The values of VDframe and VDfield are then computed 402 for the frame. The values may be computed as per the undecimated equations or may be computed in a decimated fashion as previously described. Further, as will be seen in the description of the method of FIGS. 6A-6B, the VDframe values for each frame are used by that method. Accordingly, the VDframe values computed may be stored in memory, e.g., the memory component 346 of FIG. 3A, such that they may be accessed using the number of the frame in the video sequence, e.g., in an array or a circular buffer.

The average of the VDfield values of the k frames in the current window is then computed 404. The average may be computed as per VDfieldavg=sum(VDfield[n] . . . VDfield[n-k-1])/k where n is the current frame number. If the value of VDframe for any frame in the current window is larger than the product of the VDfield average and a detection threshold 406, then 3:2 pull down is indicated 410 for the current frame. Otherwise, no 3:2 pull down is indicated 408 for the frame. Processing then continues with the next frame, if any 412. Although not specifically shown, the frame counter n is also incremented.

The detection threshold may be any suitable value and may be empirically determined. The detection threshold controls how much larger than the average the VDframe value of a frame should be before a 3:2 pull down sequence is to be detected. Note that for a 3:2 pull down sequence, the VDframe values for the $3*T_f$ frames are expected to be significantly higher than that of a normal interlaced frame, e.g., 5 to 10 times higher.

Figure 6A:
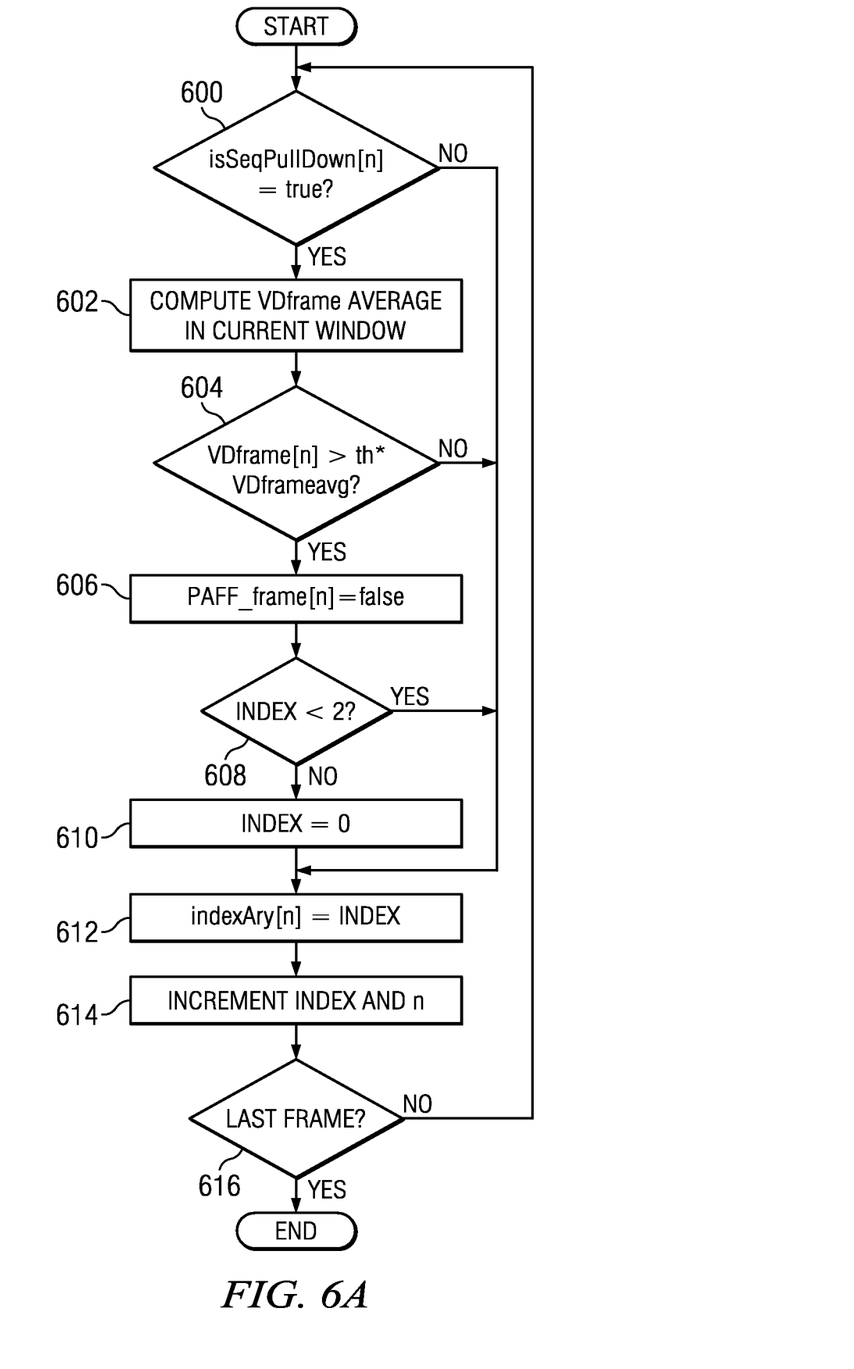
FIGS. 6A and 6B are flow diagrams of a method for frame coding mode decision.
Figure 6B:
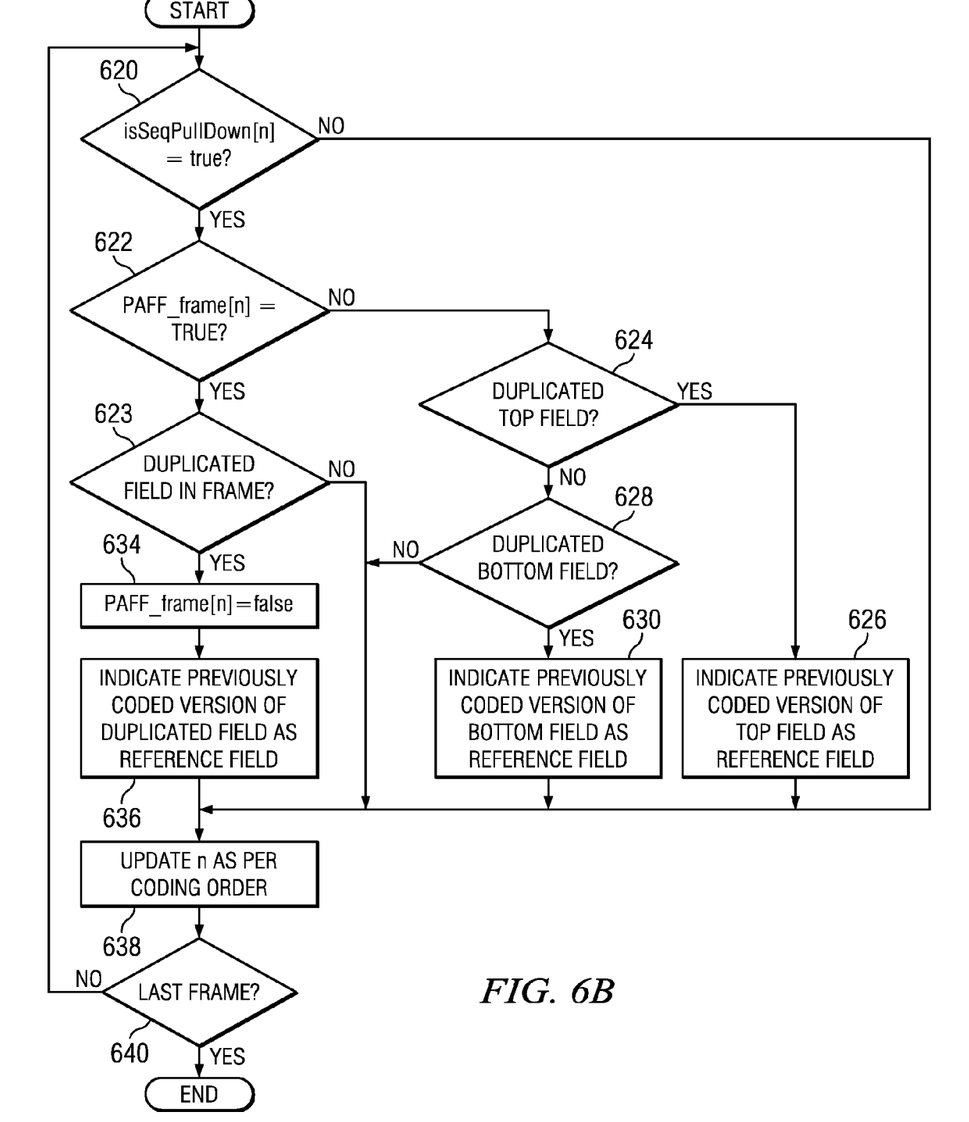

FIGS. 6A and 6B are flow diagrams of a method for picture coding mode decision and reference field selection using the output of the detection method of FIG. 5. An embodiment of the method may be implemented by the field/frame decision component 344 of FIG. 3A. The method is described with respect to the video encoder of FIGS. 3A and 3B merely for illustration. As will be apparent to one of ordinary skill in the art having benefit of the disclosure provided herein, embodiments of the method can be implemented in other devices and using other components.

The method differentiates between two types of frames in a 3:2 pull down sequence in determining whether a given frame should be coded in frame mode or field mode, i.e., frames composed of fields captured consecutively at time instances separated by Tf and frames composed of fields that were captured at time instances separated by $3*T_f$. More specifically, note that in the example 3:2 pull down sequence of FIG. 1, there is a pattern which repeats every five frames. The pattern is that in a five frame sequence, e.g., frames 5-9, three of the frames are composed of fields captured at time instants separated only by $T_f$, e.g., frames 5-7, and the other two frames are composed of fields captured at time instances separated by $3*T_f$, e.g., frames 8 and 9. A frame composed of two fields captured at time instances larger than $T_f$ may be more efficiently coded in field mode than frame mode as the spatial correlation between the two fields will be low. Further, if a frame such as frame 9 is coded in frame mode, there may not be good correlation with the reference frame as the reference frame may be frame 8 for some coding structures.

The method differentiates between the two types of frames by comparing the VDframe value of each frame with an average VDframe value of the most recent m frames. The value of m may be any suitable value and may be empirically determined. The VDframe values of the three frames formed by fields which were captured together will be significantly lower than the average VDframe value.

Also note that for the fields which are repeated in a 3:2 pull down sequence (e.g., fields T2, B4, T6, B8 of FIG. 1), better prediction may possibly be achieved if the first copy of this field encoded is selected as a reference field for encoding the second copy rather than using the reference field that would be otherwise selected by the video encoder. Such fields are referred to as duplicated fields herein. More specifically, a duplicated field is a field in a 5 frame 3:2 pull down sequence that is replicated in two consecutive frames (in display order) and will be coded after its twin is encoded. Note that the order in which replicated fields are coded depends on the coding structure in use. For example, in FIG. 1, the field B4 is replicated in frame 4 and frame 5. If an IPPP coding structure is being used and both frame 4 and frame 5 are P frames, then the field B4 in frame 5 is a duplicated field. The field B4 in frame 4 is not a duplicated field as its twin will be encoded after it is encoded. However, if an IBPBP coding structure is being used and frame 4 is a B frame and frame 5 is a P frame, then the field B4 in frame 4 is a duplicated field and the field B4 in frame 5 is not a duplicated field.

The method looks for frames with duplicated fields and causes such frames to be encoded in field mode with the previously encoded copy of whichever field is duplicated specified as the reference field for that field. To help identify frames with duplicated fields, the method uses a logical circular indexing scheme in which the index ranges from 0-4. In this index scheme, the two consecutive frames (in display order) composed of fields captured at time instances separated by $3*T_f$ are considered to be at indices 0 and 1. The next three consecutive frames composed of fields captured at time instances separated by $T_f$ are considered to be at indices 2, 3, and 4 respectively. For example, in FIG. 1, frame 1 is at index 3, frame 2 is at index 4, frame 3 is at index 0, frame 4 is at index 1, frame 5 is at index 2, frame 6 is at index 3, frame 7 is at index 4, frame 8 is at index 0, frame 9 is at index 1, and frame 10 is at index 2.

Referring now to FIGS. 6A and 6B, note that the method is performed for each frame in a video sequence. In FIG. 6A, the frames are processed in display order and in FIG. 6B, the frames are processed in the order they will be encoded, i.e., according to the coding structure in use. The variable n is a frame counter and is initially set to 0. As was previously mentioned, the method uses a moving window of m sequential frames to determine which of the two types of frames a frame in a detected 3:2 pull down sequence is. As each frame is received, the frame is added as the newest frame in the window and the oldest frame in the window is dropped. The method is described assuming that m frames have already been processed. One of ordinary skill in the art will understand the appropriate processing of the initial m frames based on this description. Also, the value of the index is assumed to be 0 at the beginning of the method.

The method assumes that a PAFF algorithm is executed on each frame to make an initial selection of frame or field coding mode. Any suitable PAFF algorithm may be used. The per-frame indicators of the selected coding mode may be stored in memory, e.g., the memory component 346 of FIG. 3A, such that they may be accessed using the number of the frame in the video sequence, e.g., in an array or a circular buffer. This data structure is referred to as PAFF_frame in the method description. The method also assigns appropriate index values to each frame. The per-frame index values may be stored in memory, e.g., the memory component 346 of FIG. 3A, such that they may be accessed using the number of the frame in the video sequence, e.g., in an array or a circular buffer. This data structure is referred to as indexAry in the method description.

Initially, a determination is made as to whether a 3:2 pull down sequence has been detected 600 at the current frame. As was previously described, the 3:2 pull down detection method sets an indicator for each frame. If the current frame is not part of a 3:2 pull down sequence, then the index for the current frame is set 612 to the current index value, both n and the index are incremented 614, and processing continues with the next frame, if any 616. Incrementing of the index is performed such that index=(index+1)−5) modulo 5.

If the current frame is part of a 3:2 pull down sequence, then the average of the VDframe values of the m frames in the current window is computed 602. As was previously described, the 3:2 pull down detection method has already computed these VDframe values. The average may be computed as per $$VDframeavg=sum(VDframe[n] \ldots VDframe[nm1])/m$$

where n is the current frame number. The VDframe value of the current frame is then compared 604 to the product of this average and a correlation threshold to determine whether the current frame is a $3*T_f$ frame or a $T_f$ frame. If the VDframe value is larger than this product, then the frame is a $3*T_f$ frame; otherwise it is a $T_f$ frame. The correlation threshold may be any suitable value and may be determined empirically. The correlation threshold controls how much larger than the average the VDframe value of a frame should be before that frame can be considered to be a $3*T_f$ frame. Note that for a 3:2 pull down sequence, the VDframe values for the $3*T_f$ frames are expected to be significantly higher than the VDframe values for the $T_f$ frames, e.g., 5 to 10 times higher.

If the frame is determined to be a $3*T_f$ frame, then field coding mode is indicated 608. Note that the original coding mode selected by the PAFF algorithm is superseded. The value of the index is then checked 608. If the index is greater than than 2, then the index is set 610 to 0; otherwise the index not changed. This test of the index serves to restart the circular indexing scheme when the first of the two $3*T_f$ frames in a 5 frame pull-down sequence is encountered. The index for the current frame is then set 612 to the current index value, both n and the index are incremented 614, and processing continues with the next frame, if any 616.

Referring now to FIG. 6B, initially, a determination is made as to whether a 3:2 pull down sequence has been detected 620 at the current frame. As was previously described, the 3:2 pull down detection method sets an indicator for each frame. If the current frame is not part of a 3:2 pull down sequence, then the frame counter n is updated 638 as per the frame coding order of the coding structure in use, and processing continues with the next frame, if any 640.

If the current frame is part of a 3:2 pull down sequence, then the current coding mode for the frame is determined 622. If the current coding mode is field coding mode, then a determination 624 is made as to whether or not the top field of the frame is a duplicated field. This determination is made based on the index for the frame and the coding structure in use. For example, if the index is 1, the top field cannot be a duplicated field as the top fields of frames with that index value are not replicated (see frames 4 and 9 of FIG. 1). However, if the index is 0, the top field of the frame is replicated and the coding order will be used to determine if the field is duplicated.

If the top field is a duplicated field, then an indication that the previously coded version of the top field should be used as the reference field for this field is set 626, the frame counter n is updated 638 as per the frame coding order of the coding structure in use, and processing continues with the next frame, if any 640. If the top field is not a duplicated field, a determination 628 is then made as to whether or not the bottom field is a duplicated field. This determination is made based on the index for the frame and the coding structure in use. For example, if the index is 1, the bottom field of the frame is replicated and the coding order will be used to determine if the field is duplicated. If the bottom field is a duplicated field, then an indication that the previously coded version of the bottom field should be used as the reference field for this field is set 630, the frame counter n is updated 638 as per the frame coding order of the coding structure in use, and processing continues with the next frame, if any 640. If the bottom field is not a duplicated field, then the frame counter n is updated 638 as per the frame coding order of the coding structure in use, and processing continues with the next frame, if any 640.

If the current coding mode is frame coding mode 622, then a determination is made 623 as to whether or not a field in the frame is a duplicated field. This determination is made based on the index for the frame and the coding structure in use. For example, if the index is 3, neither field can be a duplicated field as neither field in frames with this index value are replicated (see frame 6 of FIG. 1). However, if the index is 4 or 0, the top field is replicated and if the index is 1 or 2, the bottom field is replicated. For these index values, the coding order will be used to determine if the replicated field is a duplicated field.

If there is not a duplicated field in the frame, then the frame counter n is updated 638 as per the frame coding order of the coding structure in use, and processing continues with the next frame, if any 640. If there is a duplicated field in the frame, then field coding mode is indicated 634, superseding the coding mode selected by the PAFF algorithm. An indication that the previously coded version of the duplicated field should be used as the reference field for the field is then set 636, the frame counter n is updated 638 as per the frame coding order of the coding structure in use, and processing continues with the next frame, if any 640.

Figure 7:
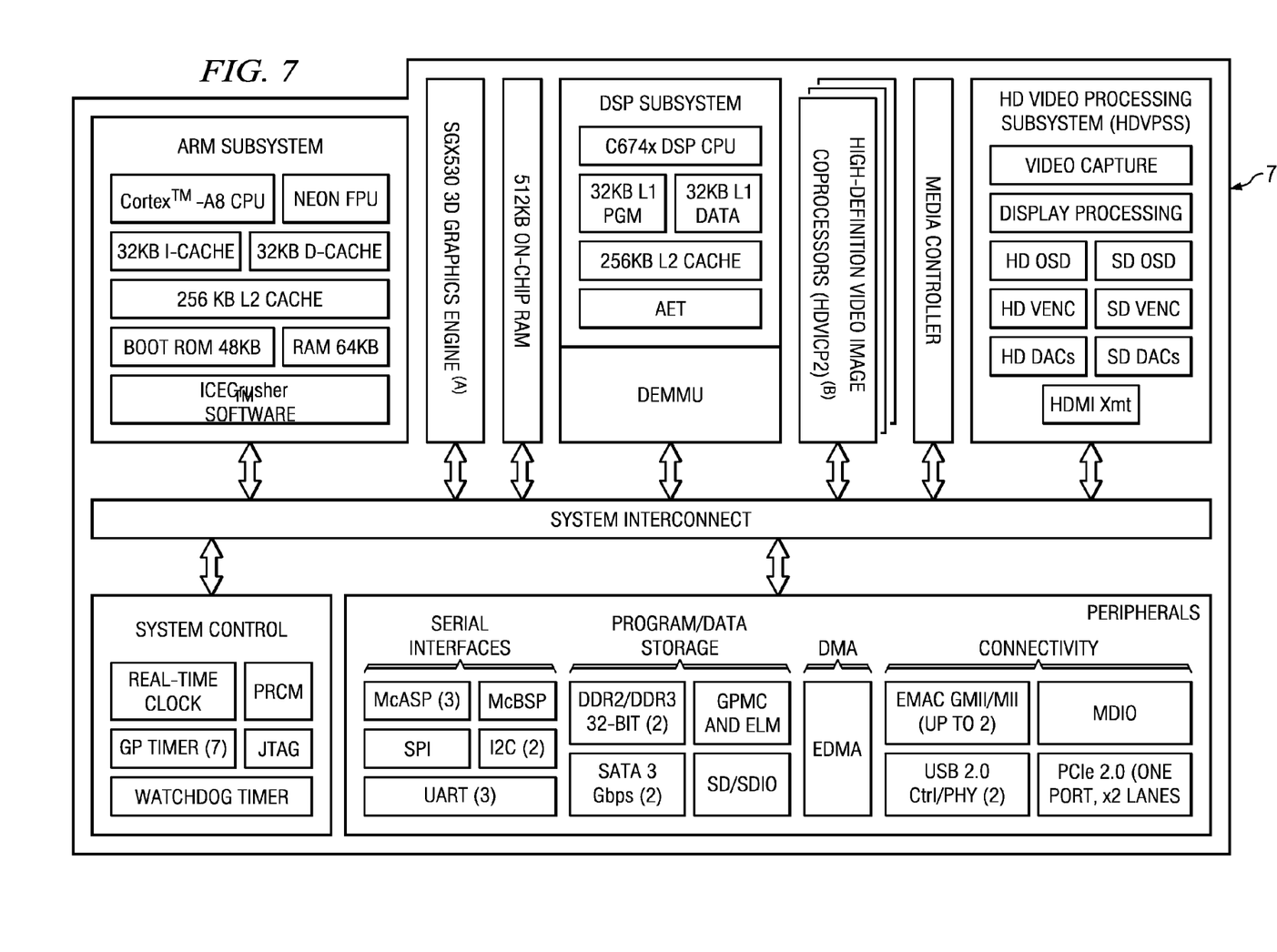
FIG. 7 is a block diagram of an illustrative digital system.

FIG. 7 is a block diagram of an example SoC 700 that may include embodiments of the methods described herein. This example SoC is representative of one of a family of DaVinci™ Digital Media Processors, available from Texas Instruments, Inc. This example is described in more detail in "TMS320DM816x DaVinci Digital Media Processors, SPRS614", March 2011 or later and is incorporated by reference herein, and is described briefly below.

The Digital Media Processors (DMP) 700 is a highly-integrated, programmable platform that meets the processing needs of applications such as the following: Video Encode/Decode/Transcode/Transrate, Video Security, Video Conferencing, Video Infrastructure, Media Server, and Digital Signage, etc. DMP 700 may include multiple operating systems support, multiple user interfaces, and high processing performance through the flexibility of a fully integrated mixed processor solution. The device combines multiple processing cores with shared memory for programmable video and audio processing with a highly-integrated peripheral set on common integrated substrate.

DMP 700 may include up to three high-definition video/imaging coprocessors (HDVICP2). Each coprocessor can perform a single 1080p60 H.264 encode or decode or multiple lower resolution or frame rate encodes/decodes. That is, the HDVICP coprocessors are designed to perform computational operations required for video encoding such as motion estimation, motion compensation, mode decision, transformation, and quantization. Further, the distinct circuitry in the HDVICP coprocessors that may be used for specific computation operations is designed to operate under the control of the ARM subsystem and/or the DSP subsystem. Multichannel HD-to-HD or HD-to-SD transcoding along with multi-coding are also possible.

Programmability is provided by an ARM® Cortex™ A8 RISC CPU, a TI C674x VLIW floating-point DSP core, and high-definition video/imaging coprocessors. The ARM® allows developers to keep control functions separate from NV algorithms programmed on the DSP and coprocessors, thus reducing the complexity of the system software. The ARM® Cortex™-A8 32-bit RISC microprocessor with NEON™ floating-point extension includes: 32K bytes (KB) of instruction cache; 32 KB of data cache; 256 KB of L2 cache; 48 KB of Public ROM and 64 KB of RAM.

A rich peripheral set provides the ability to control external peripheral devices and communicate with external processors. The peripheral set includes: an HD Video Processing Subsystem (HDVPSS), which provides output of simultaneous HD and SD analog video and dual HD video inputs, and an array of peripherals that may include various combinations of devices, such as: up to two Gigabit Ethernet MACs (10/100/1000 Mbps) with GMII and MDIO interface; two USB ports with integrated 2.0 PHY; PCIe® port x2 lanes GEN2 compliant interface, which allows the device to act as a PCIe® root complex or device endpoint; one 6-channel McASP audio serial port (with DIT mode); two dual-channel McASP audio serial ports (with DIT mode); one McBSP multichannel buffered serial port; three UARTs with IrDA and CIR support; SPI serial interface; SD/SDIO serial interface; two I2C master/slave interfaces; up to 64 General-Purpose I/O (GPIO); seven 32-bit timers; system watchdog timer; dual DDR2/3 SDRAM interface; flexible 8/16-bit asynchronous memory interface; and up to two SATA interfaces for external storage on two disk drives, or more with the use of a port multiplier.

DMP 700 may also include an SGX530 3D graphics engine to enable sophisticated GUIs and compelling user interfaces and interactions. Additionally, DMP 700 has a complete set of development tools for both the ARM and DSP which include C compilers, a DSP assembly optimizer to simplify programming and scheduling, and a Microsoft®Windows®debugger interface for visibility into source code execution.

The C674x DSP core is the high-performance floating-point DSP generation in the TMS320C6000™ DSP platform. The C674x floating-point DSP processor uses 32 KB of L1 program memory and 32 KB of L1 data memory. Up to 32 KB of L1P can be configured as program cache. The remaining is non-cacheable no-wait-state program memory. Up to 32 KB of L1D can be configured as data cache. The remaining is non-cacheable no-wait-state data memory. The DSP has 256 KB of L2 RAM, which can be defined as SRAM, L2 cache, or a combination of both. All C674x L3 and off-chip memory accesses are routed through an MMU.

On-chip shared random access memory (RAM) is accessible by the ARM processor and the DSP processor via the system interconnect. The system interconnect includes an IPC mechanism for passing messages and initiating interrupts between the ARM processor and the DSP processor.

The device package has been specially engineered with Via Channel™ technology. This technology allows 0.8-mm pitch PCB feature sizes to be used in this 0.65-mm pitch package, and substantially reduces PCB costs. It also allows PCB routing in only two signal layers due to the increased layer efficiency of the Via Channel™ BGA technology.

As was previously mentioned, DMP 700 may be configured to perform video encoding using the methods for 3:2 pull down detection and picture coding mode decision as described herein. For example, the coding control 340, 3:2 pull down detection 348, and field/frame decision 344 of the video encoder of FIG. 3A may be executed on the DSP subsystem or the ARM subsystem and at least some of the computational operations of the block processing 342 may be executed on the HDVICP2 coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein. For example, to reduce complexity, the 3:2 pull down detection may be performed at periodic frame intervals rather than for every frame, e.g., for every group of pictures (GOP) or for every n frames, n>1.

In another example, the method for 3:2 pull down detection may be used for applications other than video encoding. For example, the method be used for noise filtering of video sequences with 3:2 pull down content and deinterlacing of video sequences with 3:2 pull down content.

In another example, techniques other than the indexing described in the method of FIGS. 6A and 6B may be used to determine whether or not a field is a duplicated field.

In another example, the selection of field/frame coding for frames in a detected 3:2 pull down sequence and the reference field selection of FIGS. 6A and 6B may be used with 3:2 pull down detection techniques other than that of FIG. 5C.

Embodiments of the methods described herein are not limited to any particular video compression standard. Further, the term macroblock as used herein refers to block of image data in a picture used for block-based video encoding. One of ordinary skill in the art will understand that the size and dimensions of a macroblock are defined by the particular video coding standard in use, and that different terminology may be used to refer to such a block.

Embodiments of the methods and video encoder described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method for processing a video sequence, the method comprising:
    computing frame vertical detail and field vertical detail for a frame in the video sequence, wherein frame vertical detail is indicative of correlation between adjacent rows of pixel values in the frame and field vertical detail is indicative of correlation between adjacent rows of pixel values in fields of the frame, wherein frame vertical detail is computed as a sum of pixel differences between adjacent rows of pixels in a frame and field vertical detail is computed as an absolute sum of pixel differences between alternate rows of pixels in the frame; and
    indicating 3:2 vertical pull down in the video sequence based on the frame vertical detail and the field vertical detail.

2. The method of claim 1, wherein indicating 3:2 vertical pull down comprises:
    computing an average of field vertical detail for a plurality of frames, wherein the plurality of frames comprises the frame; and
    indicating 3:2 vertical pull down in the video sequence when frame vertical detail for any frame in the plurality of frames is sufficiently larger than the average of field vertical detail.

3. The method of claim 1, wherein frame vertical detail is computed as a sum of pixel differences between adjacent rows of pixels in selected blocks of a frame and field vertical detail is computed as an absolute sum of pixel differences between alternate rows of pixels in the selected blocks.

4. The method of claim 3, wherein the adjacent rows of pixels and the alternate rows of pixels are a subset of rows of pixels in the selected blocks.

5. The method of claim 1, further comprising:
    selecting a coding mode for the frame responsive to the indication of 3:2 vertical pull down, wherein the coding mode is one selected from a field coding mode and a frame coding mode.

6. The method of claim 5, wherein selecting a coding mode comprises:
    selecting the field coding mode when a top field of the frame and a bottom field of the frame were captured at non-consecutive time intervals;
    selecting the field coding mode when the top field and the bottom field were captured at consecutive time intervals and a field in the frame is a duplicated field; and
    using a picture adaptive frame-field (PAFF) algorithm to select the coding mode when the top field and the bottom field were captured at consecutive time intervals and neither field in the frame is a duplicated field.

7. The method of claim 5, wherein selecting a coding mode comprises:
    selecting the field coding mode when the frame vertical detail of the frame is sufficiently larger than an average of frame vertical detail computed for a plurality of frames comprising the frame; and
    using a picture adaptive frame-field (PAFF) algorithm to select the coding mode when the frame vertical detail of the frame is not sufficiently larger than the average of frame vertical detail.

8. The method of claim 6, further comprising:
    indicating, when a field in the frame is a duplicated field, that a previously encoded version of the field should be used as a reference field when coding the duplicated field.

9. The method of claim 5, further comprising:
    determining that a top field of the frame is a duplicated field; and
    indicating that a previously encoded version of the top field should be used as a reference field for the top field.

10. The method of claim 5, further comprising:
    determining that a bottom field of the frame is a duplicated field; and
    indicating that a previously encoded version of the bottom field should be used as a reference field for the bottom field.

11. A method for processing a video sequence, the method comprising:
    detecting that a frame is part of a 3:2 vertical pull down sequence in the video sequence, wherein frame vertical detail is computed as a sum of pixel differences between adjacent rows of pixels in a frame and field vertical detail is computed as an absolute sum of pixel differences between alternate rows of pixels in the frame; and selecting a coding mode for the frame responsive to the detecting, wherein the coding mode is one selected from a field coding mode and a frame coding mode.

12. The method of claim 11, wherein selecting a coding mode comprises:
   selecting the field coding mode when a top field of the frame and a bottom field of the frame were captured at non-consecutive time intervals;
   selecting the field coding mode when the top field and the bottom field were captured at consecutive time intervals and a field in the frame is a duplicated field; and
   using a picture adaptive frame-field (PAFF) algorithm to select the coding mode when the top field and the bottom field were captured at consecutive time intervals and neither field in the frame is a duplicated field.

13. The method of claim 12, further comprising:
   indicating, when a field in the frame is a duplicated field, that a previously encoded version of the field should be used as a reference field when coding the duplicated field.

14. The method of claim 11, further comprising:
   determining that a top field of the frame is a duplicated field; and
   indicating that a previously encoded version of the top field should be used as a reference field for the top field.

15. The method of claim 11, further comprising:
   determining that a bottom field of the frame is a duplicated field; and
   indicating that a previously encoded version of the bottom field should be used as a reference field for the bottom field.

16. The method of claim 11, wherein detecting that a frame is part of a 3:2 vertical pull down sequence comprises:
   computing frame vertical detail and field vertical detail for a frame in the video sequence, wherein frame vertical detail is indicative of correlation between adjacent rows of pixel values in the frame and field vertical detail is indicative of correlation between adjacent rows of pixel values in fields of the frame;
   computing an average of field vertical detail for a first plurality of frames, wherein the first plurality of frames comprises the frame; and
   detecting 3:2 vertical pull down when frame vertical detail for any frame in the first plurality of frames is sufficiently larger than the average of field vertical detail.

17. The method of claim 16, wherein selecting a coding mode comprises:
   selecting the field coding mode when the frame vertical detail of the frame is sufficiently larger than an average of frame vertical detail computed for a second plurality of frames comprising the frame; and
   using a picture adaptive frame-field (PAFF) algorithm to select the coding mode when the frame vertical detail of the frame is not sufficiently larger than the average of frame vertical detail.

* * * * *